M. BROOKFIELD.
LET-OFF MECHANISM FOR LOOMS.
No. 63,699. Patented Apr. 9, 1867.
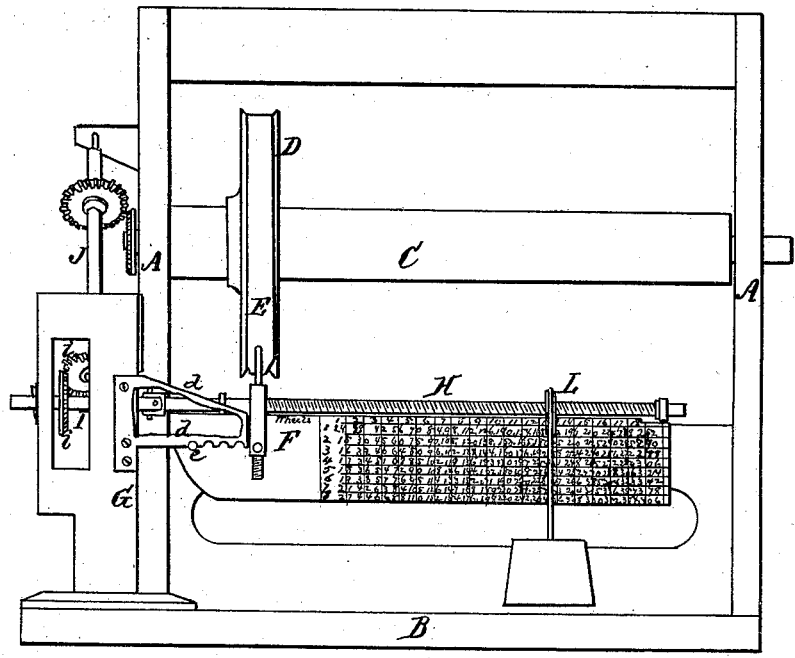

United States Patent Office.

MAHLON BROOKFIELD, OF BROOKFIELD, IOWA.

Letters Patent No. 63,699, dated April 9, 1867.

---

IMPROVEMENT IN LET-OFF MECHANISM FOR LOOMS.

---

The Schedule referred to in these Letters Patent and making part of the same.

---

TO ALL WHOM IT MAY CONCERN:

Be it known that I, MAHLON BROOKFIELD, of Brookfield, in the county of Clinton, and State of Iowa, have invented a new and improved Let-Off Mechanism for Looms; and I do hereby declare the following to be a full, clear, and exact description of the same, sufficient to enable one skilled in the art to which the invention appertains to make use of it, reference being had to the accompanying drawings, which form a part of this specification, and in which my invention is represented by a front elevation.

This is an adjustable arrangement for attachment to the yarn-beam of a loom to graduate the traction of the band in proportion to the quantity of yarn upon the beam. An even tension is required upon the yarn as it is paid off the beam, and the power of the yarn under a given strain to revolve a full beam is much greater than when it is comparatively empty. A weighted and graduated scale-beam is attached to the end of the friction-band, the weight-carrier travelling on a feed-screw as the yarn-beam revolves. A certain proportion is instituted between the range of the weight-carrier on the feed-screw and the radial capacity of the yarn-beam, and changeable gears connecting the two vary their relative speed.

A quantity of yarn being wound upon the beam, and the number of revolutions counted, the radial thickness of the yarn on the beam is measured, and from these data the proper initial position of the weight is found, so that it will reach zero on the scale when the yarn-beam is empty. The scale is graduated with vertical lines which correspond to definite proportions of radial capacity of the yarn-beam and with horizontal lines, whose numerals are calculated for different sets of gearing indicated in the left-hand column as Nos. 1 to 8.

In country places, especially, a limited quantity of warp is frequently placed on the beam, sufficient for a given quantity of cloth, or more often a certain quantity of yarn is furnished to the weaver to make as much cloth as it will. The quantity of cloth from a given weight of warp will depend to some extent on the size of the warp.

The zero point on the scale-beam represents the surface of the empty yarn-beam, and the outermost range of the weight at the end of the yarn-beam corresponds to the last coil of the warp when the beam is filled to its capacity. These zero and ultimate points are true in all cases, whatever may be the size of the warp. It will be apparent that if the beam be wound full with coarse warp, that, in unwinding, it will not revolve as many times as it would were it filled instead with fine warp and similarly unwound. The changeable gearing at the point of connection between the yarn-beam and the feed-screw is adapted to perform the required adjustment. The number of varieties of yarn being taken as eight, an equal number of sets of gearing will be required to adapt the let-off mechanism to these varying qualities of warp.

If the weaver were exactly acquainted with the warp he was about to wind upon the beam, and the hygrometric changes were insignificant, and the proper gearing were at the point of connection after winding upon the beam to any given proportion of its radial capacity, say two-thirds, he might put the weight-carrier two-thirds out from the zero point on the scale, which would adapt it to reach the zero point as the last coil came off from the yarn beam; but in the case I am about to instance, the proper place of the weight cannot be so readily estimated.

I will suppose a quantity of warp of even, but unknown size, and quantity not stated, to be presented to the weaver. This, properly prepared, is wound upon the beam, and the number of revolutions counted, say one hundred and eighty. The extent to which it fills the radial capacity of the yarn beam is noted, say two-thirds, which, in a common loom, will be four inches. The figure 12 in the upper line of the scale will indicate two-thirds of the range of the weight on the feed screw; and beneath the figure, on looking for 180, I find it in the second column. I carry my eye to the left, and in the left-hand column I find the figure 2, which indicates that I take gears No. 2, by which fifteen (next column) revolutions of the warp-beam produce one inch of rectilinear motion of the weight-carrier on the feed-screw.

I have given a fair description of the machine, as arranged for a given proportion of parts. It is, of course, capable of arrangement to suit varying needs, where the relative sizes of the core of the yarn-roller and the full roller are different to those just stated.

It will not be difficult, from the proportions I have stated and the explanations afforded, to adapt the peculiar features of my improvement to the varying necessities of a given case.

In the drawings, A A are the uprights of the loom frame, B the base. C is the warp-beam, which revolves in bearings in the uprights A. D is a drum upon the warp-beam C. The strap E passes over the drum D, is secured behind to a bar of the frame, and, in front, forms the suspension point of the scale-beam F. The latter has its inner fulcrum by the contact of the lugs $c$ with brackets $d$ on the posts G. The beam F is graduated as has been formerly described, and a certain proportion is maintained between it and the diameter of the yarn-beam. In the drawing, the drum D is supposed to have a radial width of six inches outside of the central shaft or core. The thickness of the central shaft is represented by the blank portion of the scale-beam, and the graduated portion represents the six inches of radial capacity for warp of the beam. H is a feed-screw, which, in practice, may conveniently have fourteen threads to the inch, and it is connected by gimbal-joint with a shaft, I, and gearing $i\,i$, having, say, twenty-four cogs in each wheel, and a shaft, J, and gear-wheels of similar character connecting it to the warp beam. As thus set, a certain quality of warp, say No. 1, will, in unwinding fourteen revolutions, move the weight carrier L one inch, that is, one-eighteenth of its range, the eighteen vertical divisions representing inches. Two more cogs in the wheel $i$ will make it revolve a little slower, and so on of the rest. The slower the screw revolves relatively to the warp-beam the greater number of revolutions, of course, are required to move the weight-carrier a single inch; so that, with the No. 8 wheels, it takes twenty-two revolutions of the warp-beam to move the weight-carrier one inch, and three hundred and ninety-six revolutions, the capacity of the beam with this warp to move the weight-carrier from the one end of the scale to the other, the full to the empty conditions of the warp-beam. The friction-strap E may be adjusted in length by a take-up device in the rear. The universal joint will permit considerable latitude of motion without actual disarrangement. The weight may be increased or diminished as the tension may require, according to the tractive character of the leather band, but, when arranged, it gives an even action for the whole length of its range.

Having described my invention, what I claim as new, and desire to secure by Letters Patent, is—

The graduated scale-beam F, combined with a feed-screw, H, and weight, suspended from a friction-strap or device on the warp-beam, and to be used in connection with different sets or speeds of gears, substantially as described and represented.

To the above specification I have signed my hand this 15th of January, 1867.

MAHLON BROOKFIELD.

Witnesses:
EDWARD H. KNIGHT,
SOLON C. KEMON.